(12) United States Patent
Chioua et al.

(10) Patent No.: US 12,019,432 B2
(45) Date of Patent: Jun. 25, 2024

(54) SYSTEM AND METHODS MONITORING THE TECHNICAL STATUS OF TECHNICAL EQUIPMENT

(71) Applicant: ABB Schweiz AG, Baden (CH)

(72) Inventors: Moncef Chioua, Heidelberg (DE); Matthieu Lucke, Heidelberg (DE); Emanuel Kolb, Gorxheimertal (DE); Martin Hollender, Dossenheim (DE); Nuo Li, Mannheim (DE); Andrew Cohen, Mannheim (DE)

(73) Assignee: ABB Schweiz AG, Baden (CH)

(*) Notice: Subject to any disclaimer, the term of this patent is extended or adjusted under 35 U.S.C. 154(b) by 535 days.

(21) Appl. No.: 17/207,854

(22) Filed: Mar. 22, 2021

(65) Prior Publication Data

US 2021/0209189 A1 Jul. 8, 2021

Related U.S. Application Data

(63) Continuation of application No. PCT/EP2019/073957, filed on Sep. 9, 2019.

(30) Foreign Application Priority Data

Sep. 24, 2018 (EP) .................... 18196241

(51) Int. Cl.
*G05B 23/02* (2006.01)
*G06F 17/15* (2006.01)
(Continued)

(52) U.S. Cl.
CPC ......... *G05B 23/0213* (2013.01); *G06F 17/15* (2013.01); *G06F 17/18* (2013.01); *G06F 18/22* (2023.01); *G06F 2218/12* (2023.01)

(58) Field of Classification Search
None
See application file for complete search history.

(56) References Cited

U.S. PATENT DOCUMENTS 8,311,973 B1 11/2012 Zadeh
9,197,658 B2 * 11/2015 Wittenschlaeger .......... H04L 63/1425
(Continued)

FOREIGN PATENT DOCUMENTS

CN  1950778 A   4/2007
CN  101268427 A  9/2008
(Continued)

OTHER PUBLICATIONS

Bernhard K. Fluryet et al., "Standard Distance in Univariate and Multivariate Analysis," The American Statistician, Aug. 1986, pp. 249-251, vol. 40, No. 3, Taylor & Francis, Ltd., United Kingdom.
(Continued)

*Primary Examiner* — Adolf Dsouza
(74) *Attorney, Agent, or Firm* — Leydig, Voit & Mayer, Ltd.

(57) ABSTRACT

A computer-implemented method for determining an abnormal technical status of a technical system includes: receiving, from the technical system, a plurality of signals, each signal being sampled over time and reflecting the technical status of at least one system component; computing, for each signal with associated high and low alarm thresholds obtained from an alarm management system, at every sampling time point, a univariate distance to its associated alarm thresholds as a maximum of the distances between a value of the respective signal and its associated alarm thresholds to quantify a degree of abnormality for the respective at least one system component; computing, at every sampling time point, based on the univariate distances at the respective sampling time points, an aggregate abnormality indicator (Continued)

reflecting the technical status of the technical system; and providing, to an operator, a comparison of the aggregate abnormality indicator with a predetermined abnormality threshold.

20 Claims, 8 Drawing Sheets

(51) Int. Cl.
*G06F 17/18* (2006.01)
*G06F 18/22* (2023.01)

(56) References Cited

U.S. PATENT DOCUMENTS

| | | | |
|---|---|---|---|
| 2008/0234840 A1 | 9/2008 | Brooks et al. | |
| 2010/0185414 A1* | 7/2010 | Yamamoto | G05B 23/0224 702/183 |
| 2014/0097952 A1 | 4/2014 | Shaw et al. | |
| 2015/0095100 A1 | 4/2015 | Vittal et al. | |
| 2017/0214706 A1 | 7/2017 | Wittenschlaeger | |
| 2017/0331844 A1 | 11/2017 | Harrigan et al. | |

FOREIGN PATENT DOCUMENTS

| | | | | |
|---|---|---|---|---|
| CN | 102117443 | A | 7/2011 | |
| CN | 102200769 | A | 9/2011 | |
| CN | 102231081 | A | 11/2011 | |
| CN | 102539154 | A | 7/2012 | |
| CN | 102763047 | A | 10/2012 | |
| CN | 102830662 | A | 12/2012 | |
| CN | 103513983 | A | 1/2014 | |
| CN | 104598995 | A | 5/2015 | |
| CN | 105765475 | A | 7/2016 | |
| CN | 205880599 | U | 1/2017 | |
| CN | 106775929 | A | 5/2017 | |
| CN | 207123598 | U | 3/2018 | |
| CN | 108445865 | A | 8/2018 | |
| CN | 109213654 | A * | 1/2019 | .......... G06F 11/3051 |
| EP | 2720100 | A1 | 4/2014 | |
| KR | 10-2018-0042483 | A | 4/2018 | |
| WO | WO 2009034345 | A1 | 3/2009 | |

OTHER PUBLICATIONS

James V. Kresta et al., "Multivariate Statistical Monitoring of Process Operating Performance," The Canadian Journal of Chemical Engineering, Feb. 1991, pp. 35-47, vol. 69, Canadian Society for Chemical Engineering, Canada.

Songling Cao et al., "An efficient method for on-line identification of steady state", Journal of Process Control, Mar. 1995, pp. 363-374, vol. 5, No. 6, Elsevier Science Ltd, Great Britain.

Yuhao et al., "Modeling and Analysis of Condition Monitoring and Fault Diagnosis Based on Petri Net," *Computer Measurement & Control*, 17(5): 826-829 (May 25, 2009).

Yun-Song et al., "Qualitative Simulation and Fuzzy Knowledge Based Fault Diagnosis of Centrifugal Compressor Insufficient Discharge," *Acta Automatica Sinica*, 41(11): 1867-1876 (Jul. 24, 2015).

* cited by examiner

From top to bottom, the cumulative distribution function of a discrete probability distribution, continuous probability distribution, and a distribution which has both a continuous part and a discrete part.

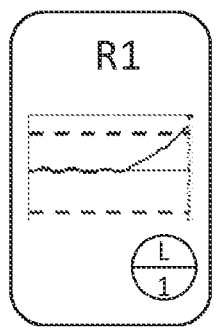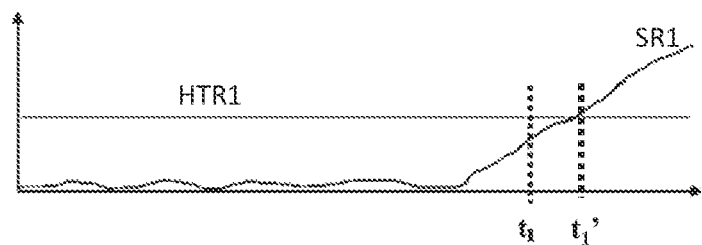
FIG. 5B
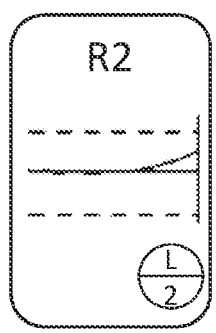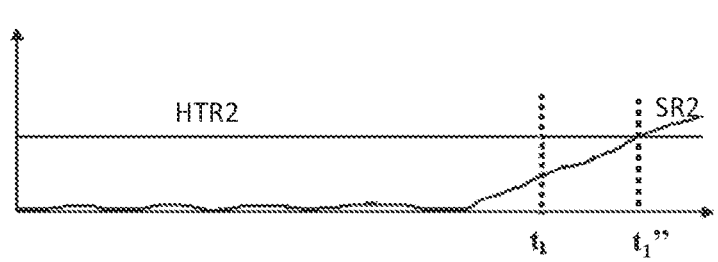
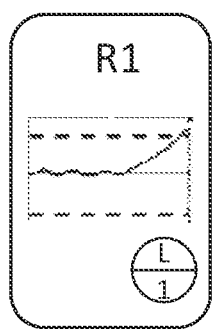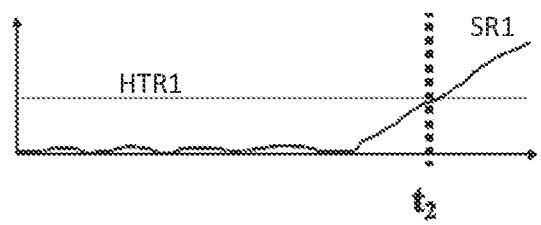
FIG. 5C
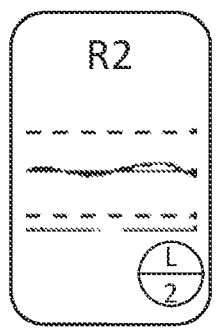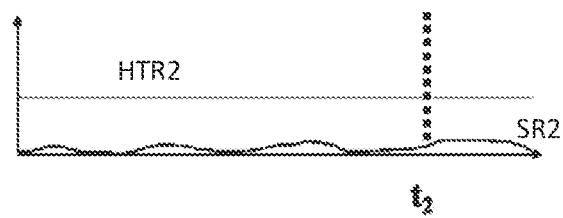

SYSTEM AND METHODS MONITORING THE TECHNICAL STATUS OF TECHNICAL EQUIPMENT

CROSS-REFERENCE TO PRIOR APPLICATION

This application is a continuation of International Patent Application No. PCT/EP2019/073957, filed on Sep. 9, 2019, which claims priority to European Patent Application No. EP 18196241.6, filed on Sep. 24, 2018. The entire disclosure of both applications is hereby incorporated by reference herein.

FIELD

The present invention generally relates to the monitoring of technical equipment and more particularly to alarm tools to support operators of technical equipment in controlling the equipment to avoid malfunctioning.

BACKGROUND

Many technical systems, such as for example the technical equipment in automation systems, can generate alarms to indicate to an operator a need to interact with the technical equipment in order to take corresponding action in response to the generated alarm. Alarm, as used herein and as defined in the technical standard IEC 62682 section 3.1.7, is an audible and/or visible means of indicating to the operator of an equipment an equipment malfunction, process deviation, or abnormal condition requiring a timely response (see also International Society of Automation ISA-18.2). An instance of a particular alarm is referred to as an alarm activation.

In real world situations, often a series of alarm activations are generated which depend on a single root cause where actually a single alarm would be sufficient to indicate the problem in the technical system. Such series of alarm activations are usually referred to as alarm floods. Alarm flood situations are characterized by a combination of a plurality of alarm activations which occur repeatedly. In other words, the same or similar combinations of alarms typically appear in multiple alarm floods. In general, permanent high alarm rates indicate bad alarm quality. Good alarm quality is achieved when:
  each alarm alerts, informs and guides,
  alarms are presented at a rate that operators can deal with, and
  detectable problems are alarmed as early as possible.

There are different approaches for monitoring large and complex industrial systems to detect abnormal situations and to generate respective alarm notifications to the operator(s). For example statistical data-driven methods for (multivariate) process monitoring such as PCA and PLS (cf. "Multivariate statistical monitoring of process operating performance" by Kresta, Macgregor, & Marlin, 1991 in The Canadian Journal of Chemical Engineering, 69(1), 35-47) are using statistical analysis applied to actual measurements or technical status data. Alternatively, intelligent visualization approaches such as parallel coordinate transformation combined with convex hulls calculated for each pair of variables (cf. cf. Multi-Variable Operations; US patent application US20080234840A1; Brooks et al.) allows displaying ranges of the process variables in parallel coordinates as a pair of linear curves between corresponding parallel axes. However, such statistical or mathematical analysis rely solely on historical values of the process variables and do not take into account any process knowledge of the monitored processes and therefore suffers from high numbers of false positives in the detected alarms because it does not become clear what actually is an abnormal situation.

A certain deviation of a technical status parameter may be identified by statistical monitoring for triggering an alarm notification although the deviation may still be seen as being within the normal operation of the respective equipment.

As a consequence, it is difficult for operators to retrieve reliable abnormality information regarding the overall technical status of the monitored technical equipment from said alarm notifications merely based on such statistical analysis.

SUMMARY

In an embodiment, the present invention provides a computer-implemented method for determining an abnormal technical status of a technical system, comprising: receiving, from the technical system, a plurality of signals, each signal being sampled over time and reflecting the technical status of at least one system component; computing, for each signal with associated high and low alarm thresholds obtained from an alarm management system, at every sampling time point, a univariate distance to its associated alarm thresholds as a maximum of the distances between a value of the respective signal and its associated alarm thresholds to quantify a degree of abnormality for the respective at least one system component; computing, at every sampling time point, based on the univariate distances at the respective sampling time points, an aggregate abnormality indicator reflecting the technical status of the technical system; and providing, to an operator, a comparison of the aggregate abnormality indicator with a predetermined abnormality threshold, the abnormality threshold ensuring with a given probability that an aggregate abnormality indicator value, when below the abnormality threshold, reflects normal operation of the technical system, the abnormal technical status being determined when the aggregate abnormality indicator exceeds the abnormality threshold.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 5A to 5C illustrate a real-world example scenario for which an aggregate abnormality indicator is determined;

DETAILED DESCRIPTION

Figure 1:
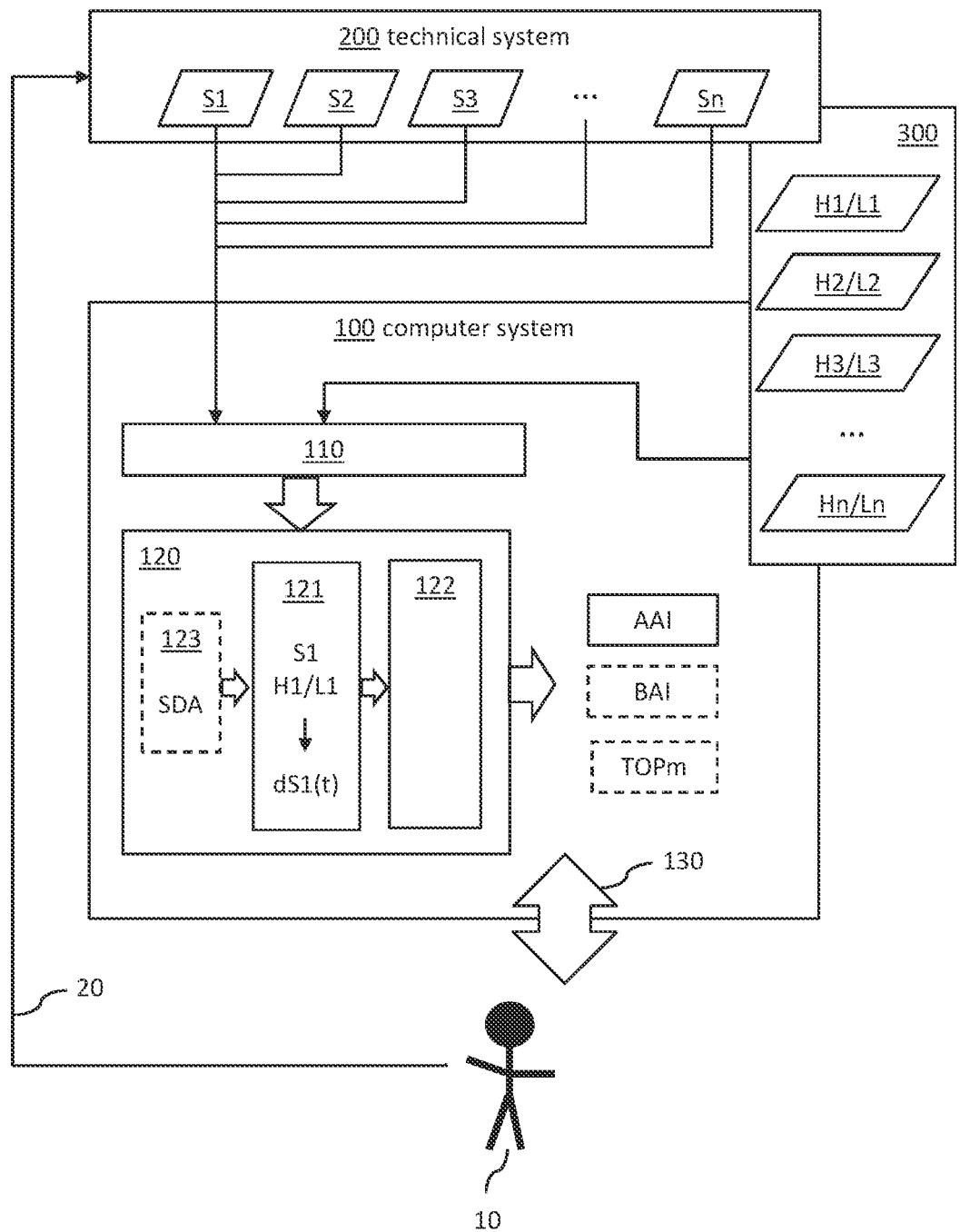
FIG. 1 includes a block diagram of a computer system for determining an abnormal technical status of a technical system according to an embodiment.

In an embodiment, the present invention provides improved alarm detection for operators in that the operator can quickly determine the overall technical status of the monitored equipment so that the number of false positives is reduced and the operator is enabled to take appropriate corrective action if required.

The method, computer program product and computer system as described herein disclose embodiments of a technical solution to the above problem.

In one embodiment, a computer-implemented method is provided for determining an abnormal technical status of a technical system. In another embodiment, a computer system is configured to execute said method by executing a corresponding computer program which includes program instructions that cause the computer system to execute corresponding method steps when loading the computer program into a memory of the computer system and processing the instructions with one or more processors.

The computer system receives a plurality of signals from a technical system. Each signal is sampled over time (using the same sampling frequency), or is resampled in a preprocessing step in order to ensure the availability of either a measured or of an estimated value of the plurality of signals at each instance of the computation) and reflects the technical status of at least one system component of the technical system. That is, each signal relates to one system component but a particular system component can be monitored by an operator via multiple signals. Typically, the technical system is monitored by one or more human operators. The entirety of all signals reflects the overall technical status of the entire technical system. However, a human operator cannot derive the information about the overall technical status of the technical system from single signals at the sensor level because there is no possibility for a human being to make sense out of the plurality of signals received in real-time from the sensors.

The computer system assists the operator in this monitoring task by deriving from the received sensor signals a single aggregate abnormality indicator reflecting the technical status of the entire system.

An alarm management system is associated with the technical system. The alarm management system stores information in relation to alarms which are associated with the signals. An alarm management system is a system for prioritizing, grouping and classifying alerts and event notifications used in supervisory control and data acquisition (SCADA) to improve the provisioning of technical status information to an operator. Most often the major problem is that there are too many alarms annunciated in a plant upset, commonly referred to as alarm flood as explained above. However, there can also be other problems with an alarm system such as poorly designed alarms, improperly set alarm points, ineffective annunciation, unclear alarm messages, etc. Poor alarm management is one of the leading causes of unplanned downtime and of major industrial incidents. The alarm management system stores high alarm thresholds and low alarm thresholds associated with respective received signals. Signal values of a particular signal in a range between the associated high alarm threshold and the associated low alarm threshold reflect normal operation of the respective at least one system component. In other words, the alarm thresholds for a particular signal are based on historic knowledge of normal operation and abnormal system behavior. The alarm thresholds reflect critical values beyond which the respective signal value is not perceived anymore as being within the normal operation range. The alarm management system typically raises an alarm per signal when the signal value is exceeding any of the corresponding alarm thresholds. As many technical status parameters are correlated, this typically results in the so-called alarm floods overwhelming the operator with information which cannot be resolved by the operator.

The alarm management system can be an integral part of the computer system or it can be a remote system which is communicatively coupled with the computer system so that the computer system can access the data available in the alarm management system. The computer system retrieves the high alarm thresholds and low alarm thresholds associated with the respective received signals from the alarm management system via an appropriate interface. The retrieval of the alarm threshold values may, for example, occur as a kind of initialization step for the computer system. That is, before the computer system starts any computations, it may retrieve all available alarm thresholds from the alarm management system. The retrieval may be repeated at regular update intervals to take into account changes in the alarm management system. For example, an update retrieval may only retrieve alarm thresholds for signals which are actually monitored via the computer system.

The computer system has a data processor which is configured to perform the computing tasks as described in the following. Firstly, the data processor computes, at every sampling time point, for each signal with associated alarm thresholds, a univariate distance to its associated alarm thresholds. In general, a univariate distance is the (simple) distance between the values of a single variable j for two observations i and 1. In the present application, a univariate distance is the maximum of the distances between the value of the respective signal and its associated alarm thresholds to quantify a degree of abnormality for the respective at least one system component. The univariate distance d(t) for a particular signal at sampling time point t can be expressed by the following mathematical formula:

$$d(t) = \max\left(\frac{x(t) - a}{x_l - a}, \frac{x(t) - a}{x_h - a}\right) \quad (F1)$$

where x(t) is the sample of the signal at time t, $x_h$ is the high alarm threshold associated with the signal as defined in the alarm management system, xi is the low alarm threshold associated with the signal, and a is the normal value of the variable ($x_l$<a<$x_h$).

For example, a can be chosen as xh+xl/2 by default but other values between xi and $x_h$ can be chosen for example by estimating the normal operating value based on normal operation data.

In one embodiment, the univariate distance for a particular signal at a particular sampling time point can be computed as a piecewise linear index so that $$d(t) \in ]0,1[ \text{ when } x(t) \in ]x_l, x_h[ \quad (F2a)$$

$$d(t) = 1 \text{ when } x(t) \geq x_h \text{ or when } x(t) \leq x_l \quad (F2b)$$

$$d(t) = 0 \text{ when } x(t) = a \quad (F2c)$$

In other words, the distance value is between 0 and 1 if the sampled signal value is between the low alarm threshold and the high alarm threshold (F2a); the distance value is 1 if the sampled signal value is less than or equal to the low alarm threshold, or greater than or equal to the high alarm threshold (F2b); and the distance value is 0 if the sampled signal value corresponds to a predefined parameter value reflecting normal operation (F2c).

In an alternative embodiment, the univariate distance d (t) can be computed as a smoothened index instead of the piecewise linear computation above.

For example, d(t) can be computed using exponential smoothing as:

$$d(t) = \max\left(\left(\frac{x-a}{x_l-a}\right)^a, \left(\frac{x-a}{x_h-a}\right)^a\right) \text{ where}$$ (F3)

$a > 1$ (typically $a = 2$)

For example, a=2 relates to parabolic smoothing and a=3 relates to hyperbolic smoothing.

Further, a real signal is noisy in that its "normal" value is fluctuating around this value "a" with a Gaussian distribution. Therefore, the computation of the univariate distances can be further improved by introducing an interval defining a "normal range" $[a_1, a_2]$ of the signal, with the upper interval limit $a_2$ being less than the respective high alarm threshold $x_h$ and the lower interval limit $a_1$ being greater than the respective low alarm threshold $x_l$. Such an interval is used as a deadband for the normal range $a_l$ and $a_2$ ($x_l < a_1 < a_2 < x_h$). A deadband (sometimes called a neutral zone or dead zone) is a band of input values in the domain of a transfer function in a control system or signal processing system where the output is zero (the output is 'dead'—no action occurs). Deadband regions can be used in control systems such as servo-amplifiers to prevent oscillation or repeated activation-deactivation cycles.

With such a deadband the univariate distance d(t) for a particular signal can be computed as the following index:

$$d(t)=0 \text{ for } x(t) \in [a_1, a_2]$$ (F4a)

$$d(t) = \left(\frac{x(t) - a1}{xl - a1}\right)^a \text{ for } x(t) < a_1$$ (F4b)

$$d(t) = \left(\frac{x(t) - a2}{xh - a2}\right)^a \text{ for } x(t) > a_2$$ (F4c)

In other words, the distance value is 0 if the sampled signal value is inside the deadband interval for a particular signal at a particular sampling time point (F4a); the distance value is $$\left(\frac{x(t) - a_1}{x_l - a_1}\right)^a$$

for signal values below the lower interval limit of the normal range (F4b), and the distance value is $$\left(\frac{x(t) - a_2}{x_h - a_2}\right)^a$$

signal values above the upper interval limit of the normal range (F4c).

Once the univariate distances are determined by the data processor, a further computing step is executed. At every sampling time point the computer system now computes, based on the univariate distances at the respective sampling time points, an aggregate abnormality indicator reflecting the technical status of the entire technical system.

In one embodiment, the aggregate abnormality indicator is computed as the Euclidian distance D(t) based on the univariate distances of the respective signals and the total number of signals:

$$D(t) = \sqrt{\Sigma_{i=1}^N d_i(t)^2}$$ (F5).

In an alternative embodiment, the aggregate abnormality indicator is computed as a weighted Euclidian distance $D_w(t)$ based on the univariate distances of the respective signals and the total number of signals wherein each univariate distance contribution is weighted with a weighting factor corresponding to the severity of an alarm associated with the respective signal as defined in the alarm management system:

$$D_w(t) = \sqrt{\Sigma_{i=1}^N w_i d_i(t)^2} \text{ where } \Sigma_{i=1}^N w_i = 1, \text{ and } w_i \geq 0 \text{ for}$$
$$l = 1 \ldots n$$ (F6)

where $d_i(t)$ corresponds to the univariate distance of signal i, and N the total number of received signals.

The aggregate abnormality indicator now reflects the technical status of entire technical system because it includes the technical status information with regards to all monitored system components. In other words, the presentation of the aggregate abnormality indicator to an operator provides to the operator visual indications about the internal state prevailing in said technical system. To enable the operator to quickly recognize abnormal system behavior and take corrective action the system provides a comparison of the aggregate abnormality indicator with a predetermined abnormality threshold. The abnormality threshold is chosen to ensure with a given probability (or confidence, e.g. 95%) that an aggregate abnormality indicator value being below the abnormality threshold reflects normal operation of the technical system. The given probability may be defined as a target probability by the user or it may be a predefined confidence value. For example, the abnormality threshold can be determined by using a cumulative distribution function of the aggregate abnormality indicator during normal operation of the technical system as know by a person skilled in the art. An abnormal technical status is determined when the aggregate abnormality indicator exceeds the abnormality threshold.

The aggregate abnormality indicator AAI provides simplified technical status information for the entire system which can easily be processed by the operator. For example, the moment the AAI exceeds the abnormality threshold in a respective graphical visualization the operator is alerted that the technical system shows abnormal behavior. In other words the AAI is a trigger for the operator to perform a more thorough system analysis to identify the root cause of the abnormal behavior. The trigger point in the AAI curve is typically reached even before an alarm is triggered by the alarm management system as alarms triggers typically depend on patterns in the signal behavior which can easily extend over a longer time period. The AAI does not need any pattern recognition but simply looks at the aggregate indicator for all signals. As a consequence, no high performance hardware and complex models for pattern recognition are not required since the described approach is a purely data driven approach which can readily be used for technical systems in plants without the need for adapting the hardware or OPC Alarm and Events (A&E) server.

For applying the method for determining an abnormal technical status of the technical system it is advantageous when the technical system is running in a steady-state. Therefore, prior to the computing steps for AAI computation, a steady-state detection algorithm can be used to determine whether the technical system operates in a steady-state process. If the process is not in a steady state the AAI computation can be suppressed. This optional switching function saves computing resources for periods where a meaningful AAI computation is not possible. Steady-state detection algorithms are well known in the art and disclosed in numerous papers, such as for example, "An efficient method for on-line identification of steady state" by Cao, S., & Rhinehart, R. R., 1995, in Journal of Process Control, 5(6), 363-374.

As mentioned earlier, the AAI can be interpreted as a trigger function for the operator to perform a root cause analysis for the technical system. The disclosed method can also support the operator in this task. In one embodiment, the computer system further provides to the operator a subset of the univariate distances at the respective sampling time points wherein the subset relates to such univariate distances with the highest contributions to the augmentation of the aggregate abnormality indicator. The size of this subset may be configurable by the operator. For example, the operator may define 5 or 10 to configure the computer system, to show, a drill down option for the AAI, the top 5 or the top 10 univariate distances. As a result, the operator immediately can see which signals—and therefore which system components—are primarily responsible for the AII increase beyond the abnormality threshold.

In a further alternative embodiment, the support for root cause analysis is further improved. A component hierarchy of the technical system may define a plurality of functional blocks of the technical system. The functional blocks can be represented by child nodes of the technical system in the component hierarchy. Each functional block can again include a plurality of child nodes including further functional blocks and/or system components. That is the hierarchy can describe multiple levels of functional blocks (nested functional blocks). The computer system can now compute aggregate block abnormality indicators (BAI) for the respective functional blocks at every sampling time point. The computation for a particular functional block is thereby based on a subset of univariate distances associated with the particular functional block (at the respective sampling time points). The computed block abnormality indicator(s) (BAI) reflect the technical status of the functional blocks of the technical system. The computer system can now also provide a comparison of the block abnormality indicator (BAI) with a predetermined block abnormality threshold to the operator. Also the block abnormality threshold is chosen to ensure with a given probability that an aggregate block abnormality indicator value below the block abnormality threshold reflects normal operation of the particular functional block. By using such BAI in addition to the AAI and the univariate distances the operator receives simplified technical status parameters for each functional block defined in the component hierarchy. That is, the operator can quickly drill down to respective functional blocks of the technical system (e.g., boiler, pump, turbine, or area of the process) when the AAI exceeds the abnormality threshold and identify the functional blocks which contribute most to the abnormality. Similar as for the univariate distances the computer system can provide a ranking list with the functional blocks contributing most to the abnormal behavior. Of course, for each BAI a further drill down is possible to the respective univariate distances. Through this option, the operator can quickly identify the system components of the functional block which cause the malfunctioning of the entire system.

In one embodiment, a particular technical status parameter may be represented by multiple sensor signals providing redundant information in specifying the particular technical status. In such a scenario the computation of a univariate distance for said technical status parameter can be performed in a way which is robust against failure of a sensor providing redundant information. In other words, robustness against failure means that the failure of a single sensor does not significantly affect the reliability of the technical status parameter which is reflected by the corresponding univariate distance. This is achieved by aggregating the univariate distances associated with the multiple sensor signals to provide a robust univariate distance for the particular technical status parameter. Even if one of the signals disappears (e.g., because the battery or a data communication link of the sensor fails) the robust univariate distance still provides meaningful information about the normal/abnormal behavior of the respective system component.

In one embodiment, a computer program product is provided for determining an abnormal technical status of a technical system. The program comprises instructions that, when loaded into a memory of a computer system and being executed by at least one processor of the computer system, cause the computer system to perform the method steps as disclosed herein.

The computer system for executing said computer program can be described by functional modules which are configured to execute said method steps at system runtime. The computer system has an interface to receive, from the technical system, a plurality of signals wherein each signal is sampled over time and reflects the technical status of at least one system component. Further, via the interface, the computer system retrieves, from an alarm management system associated with the technical system, high alarm thresholds and low alarm thresholds associated with respective received signals. Signal values of a particular signal in a range between the associated high alarm threshold and the associated low alarm threshold reflect normal operation of the respective at least one system component.

Further, the computer system has a data processor to compute for each signal with associated alarm thresholds, at every sampling time point, a univariate distance to its associated alarm thresholds as the maximum of the simple distances between the value of the respective signal and its associated alarm thresholds to quantify a degree of abnormality for the respective at least one system component; and to compute, at every sampling time point, based on the univariate distances at the respective sampling time points, an aggregate abnormality indicator reflecting the technical status of the entire technical system. The term "at every sampling time point", as used herein, refers to each sampling time point which is used for said computational steps. That is, in cases with high sampling frequencies, it may be sufficient to perform the computational steps only for every second, third, etc. sampling time point. The skilled person will understand that it is not necessary to use each physical sampling time point under any circumstances.

A user interface of the computer system provides a comparison of the aggregate abnormality indicator with a predetermined abnormality threshold to an operator. The abnormality threshold ensures with a given probability (confidence) that an aggregate abnormality indicator value, when being below the abnormality threshold, reflects normal operation of the technical system. In other words, the technical system transitions into an abnormal technical status when the aggregate abnormality indicator exceeds the abnormality threshold.

In one embodiment, the computer system further includes a computation switch with a steady-state detection algorithm (SDA) configured to determine whether the technical system operates in a steady-state process, and to suppress subsequent computation steps when the process is not in a steady state.

In one embodiment, the computer system has a component hierarchy of the technical system. The hierarchy defines a plurality of functional blocks as child nodes of the technical system with each functional block comprising a plurality of child nodes comprising further functional blocks and/or system components. The processor of the computer system can compute, at every sampling time point (i.e., the sampling time points used for the computations), based on a subset of univariate distances associated with a particular functional block, at the respective sampling time points, an aggregate block abnormality indicator BAI for the particular functional block wherein the block abnormality indicator reflects the technical status of the functional block. The user interface can provide, to the operator, a comparison of the BAI with a predetermined block abnormality threshold. The block abnormality threshold ensures with a given probability that an aggregate block abnormality indicator value below is the block abnormality threshold, reflects normal operation of the particular functional block.

In one embodiment, the user interface further provides to the operator a subset of the univariate distances at the respective sampling time points wherein the subset relates to such distances with the highest contributions to the augmentation of the aggregate abnormality indicator or a respective block abnormality indicator. The subset has a size which is configurable (e.g., by the operator) or predefined.

FIG. 1 is a block diagram of an example embodiment of a computer system 100 for determining an abnormal technical status of a technical system 200 according to an embodiment. The computer system 100 and the technical system 200 are communicatively coupled and the computer system 100 is configured to monitor the technical status of the technical system 200. For example, the technical system 200 can be a process plant, a power plant or any other equipment to execute an industrial process. Typically, the industrial processes in the plant (e.g., chemical, oil refineries, paper and pulp factories, etc.) are controlled by an automation system which uses a network to interconnect sensors, controllers, operator terminals and actuators. Such automation systems often use a control system architecture called supervisory control and data acquisition (SCADA). The computer system 100 has an interface 110 to receive from the technical system 200 a plurality of signals S1 to Sn. Each signal is sampled over time and reflects the technical status of at least one system component. For example, a temperature signal may reflect the technical status of a motor component by indicating the temperature of the motor (a too high temperature can be an indicator for overheating). At the same time, a further signal, such as a vibration sensor signal may also provide technical status information about the motor as too high vibrations may indicate a problem with the bearings of the motor. A person skilled in the art knows which types of sensors are suitable in a technical system to monitor the technical status of respective components or functional blocks of the technical system. A functional block can include multiple system components which together perform a certain function (e.g., cleaning of a gas).

Figure 2:
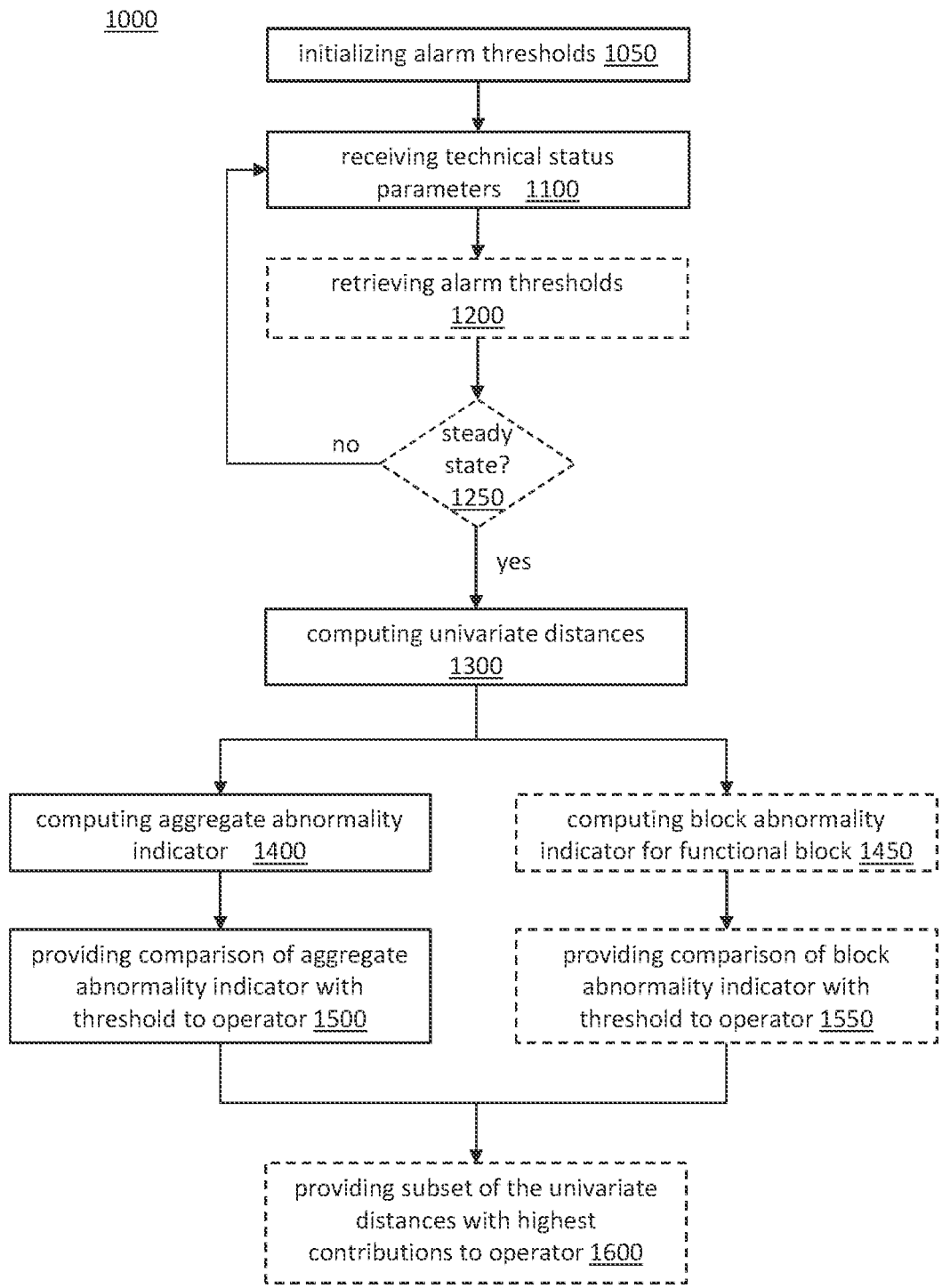
FIG. 2 is a simplified flow chart of a computer-implemented method for determining an abnormal technical status of a technical system according to an embodiment.

FIG. 2 is a simplified flow chart of a computer-implemented method 1000 for determining an abnormal technical status of the technical system 200. The computer system 100 can execute the method when loading a computer program into a memory of the computer system 100 wherein the computer program has computer-readable instructions that, when loaded and being executed by at least one processor of the computer system 100, cause the computer system to perform the steps of the method 1000.

In the following, the computer system 100 of FIG. 1 is disclosed in the context of the flow chart of FIG. 2. For this reason, the following description uses reference numbers referring to FIG. 1 and FIG. 2. Optional components of the computer system 100 and optional method steps are illustrated by dashed lines in the respective figures.

To receive 1100 the sensor data S1 to Sn from the technical system 200 via interface 110 the computer system 100 can use any appropriate protocol standard for process automation protocols. For example, a person skilled in the art may select an appropriate protocol from the protocol standards listed in the Wikipedia list of automation protocols available at: https://en.wikipedia.org/wiki/List_of_automation_protocols.

In addition, the computer system 100 is communicatively coupled with an alarm management system 300 associated with the technical system 200. The alarm management system 300 can also be an integral part of the computer system 100, or it may be running on a remote computer which is accessible by the computer system 100 through a respective network. The alarm management system 300 stores or determines high alarm thresholds H1 to Hn and low alarm thresholds L1 to Ln associated with respective signals S1 to Sn of the technical system 200. Thereby, signal values of a particular signal in a range between the associated high alarm threshold and the associated low alarm threshold reflect normal operation of the respective system component which is monitored by said particular signal. Alarm management is typically used in a process manufacturing environment that is controlled by an operator using a supervisory control system, such as a DCS, a SCADA or a programmable logic controllers (PLC). Such a system may have hundreds of individual alarms that often are designed with only limited consideration of other alarms in the system. Since humans can only do one thing at a time and can pay attention to a limited number of things at a time, there needs to be a way to ensure that alarms are presented at a rate that can be assimilated by a human operator, particularly when the plant is upset or in an unusual condition. Advantageously, alarms should be capable of directing the operator's attention to the most important problem that he or she needs to act upon, using a priority to indicate degree of importance or rank, for instance. However, although alarm management systems include all the knowledge of alarm situations for the associated technical system (reflected by the low/high alarm thresholds) the systems do not provide aggregate indicators which reflect the overall technical status of the entire plant. Still, the information about the alarm thresholds is valuable in this context because it includes the knowledge about the entire alarm history of the technical system. In an initialization step, the computer system 100 can retrieve 1050 the high alarm thresholds H1 to Hn and low alarm thresholds L1 to Ln associated with respective signals S1 to Sn of the technical system 200 from the alarm management system 300 and use such data for the following data processing steps to determine an indicator reflecting the technical status of entire technical system 200 based on the received signal data and alarm thresholds. This indicator will be referred to as aggregate abnormality indicator AAI of the technical system 200. Optionally, the computer system can perform update retrieval steps 1200 to accommodate for changes in the alarm management system during the operation of the technical system. Such update retrievals 1200 may be limited to alarm thresholds associated with signals which are actually monitored via the computer system 100.

The computer system 100 has a data processor 120 with various modules for performing data processing task with respect to the received input data (signals S1 to Sn and high/low alarm threshold pairs (H1/L1 to Hn/Ln). In the example, each signal S1 to Sn has an associated alarm threshold pair. In a real technical system, there may be signals with no associated alarm threshold pairs. Such signals can be ignored by the data processor when performing the following computations. The aggregate abnormality indicator is computed with alarms that have an associated limit like, for example, absolute alarms, deviation alarms, rate of change alarms as defined by the standard NAMUR NA 102 for the application of alarm management. A version dated 2 Oct. 2018 of the NA 102 specification can be obtained at https://www.namur.net/de/empfehlungen-u-arbeitsblaetter/aktuelle-nena.html.

For each signal (e.g., signal S1) with an associated alarm threshold pair (e.g., H1/L1), a univariate distance module 121 of the data processor computes 1300 at every sampling time point a univariate distance (e.g., $dS1(t)$) to the alarm thresholds associated with the respective signal. The univariate distance is determined as the maximum of the distances between the value of the respective signal and its associated alarm thresholds to quantify a degree of abnormality for system component(s) associated with the respective signal.

Thereby, a computation may be used in accordance with formulas F1, F2a to F2c. Alternatively, exponential smoothing may be used in accordance with formulas F3, F4a to F4c. The computed univariate distances are then provided as input to an abnormality indicator module 122 of the data processor.

Module 122 computes 1400, at every sampling time point, based on the univariate distances at the respective sampling time points, the aggregate abnormality indicator AAI reflecting the technical status of the entire technical system 200. For example, the aggregate abnormality indicator at a particular sampling time point may be computed as the Euclidian distance based on the univariate distances of the respective signals and the total number of signals in accordance with formula F5.

Alternatively, it may be computed as a weighted Euclidian distance based on the univariate distances of the respective signals and the total number of signals in accordance with formula F6. Thereby, each univariate distance contribution is weighted with a weighting factor corresponding to the severity of an alarm associated with the respective signal as defined in the alarm management system. In other words, alarms for signals whose associated components may have a lower impact on the overall technical performance of the technical system 200 may contribute less to the aggregate abnormality indicator.

The computer system 200 further has a user interface (UI) component 130. The UI 130 can be implemented as any kind of human machine interface (HMI) which allows an operator 10 of the technical system to communicate with the computer system 200. The UI 130 can include respective input/output means including but not limited to audio-visual means including display/sound output means to convey information to the user and data input means (e.g., keyboard, mouse, touch screen, etc.) to receive input data from the user. The UI 130 provides 1500 a comparison of the aggregate abnormality indicator AAI with a predetermined abnormality threshold to the operator 10. The abnormality threshold ensures with a given probability that an aggregate abnormality indicator value, when being below the abnormality threshold, reflects normal operation of the technical system 200. In other words, when the aggregate abnormality indicator value is less than the abnormality threshold then there is a given probability (e.g., with a confidence of 0.95) that the technical system 200 is in normal operation. By using a corresponding abnormality threshold this probability can even become higher (e.g. 0.99). Advantageously, the abnormality threshold is determined by using a cumulative distribution function of the aggregate abnormality indicator AAI during normal operation of the technical system 200. The computational tasks in steps 1300, 1400 and 1500 of the method 1000 are discussed in more details with the description of FIGS. 3A to 3C.

In an optional embodiment, the data processor 120 has a computation switch 123. The computation switch is implemented as a steady-state detection algorithm SDA which can determine 1250 whether the technical system 200 operates in a steady-state process or not. If the technical system is not in a steady state ("no") the computer system does not perform any of the computational tasks of steps 1300, 1400, 1500. Otherwise ("yes") the method 1000 continues with step 1300. For said computational tasks it is advantageous that the process run by the technical system is in steady-state. Therefore, the computation switch 121 can switch off the computation of all indices (univariate distances and aggregate abnormality indicator) during transient stages. For example, a well-known steady-detection algorithm can be used to identify when the computation of the indices should be turned on again (e.g., Cao, S., & Rhinehart, R. R. (1995). An efficient method for on-line identification of steady state. Journal of Process Control, 5(6), 363-374).

In a further optional embodiment, the computer system 100 can access a component hierarchy of the technical system 200. Such a component hierarchy may either be stored by the computer system itself or it may be provided by the technical system or its associated automation system. The component hierarchy defines a plurality of functional blocks as child nodes of the technical system. Each functional block can include a plurality of child nodes which may either be further functional blocks and/or system components of the technical system. In other words, a functional block is used to group multiple system components together which can be associated with the same function of the technical system. Such functional blocks are sometimes also referred to as process blocks (e.g., boiler, pump, turbine, or area of the process). Details of the component hierarchy are discussed in the context of FIG. 4.

In this optional embodiment, the data processor 120 is further configured to compute 1450 aggregate block abnormality indicator(s) BAI at every sampling time point. The block abnormality indicator(s) BAI reflects the technical status of respective functional block(s).

Based on a subset of univariate distances associated with a particular functional block (at the respective sampling time points) a corresponding aggregate block abnormality indicator BAI is computed for the particular functional block. The computation is performed in a similar manner as the computation of the AAI but only for the subset of univariate distances associated with the particular functional block. Further, the user interface 130 provides 1550, to the operator, a comparison of the particular block abnormality indicator BAI with a predetermined block abnormality threshold. Similar as for the AAI comparison, the block abnormality threshold ensures with a given probability that an aggregate block abnormality indicator value, when being below the block abnormality threshold, reflects normal operation of the particular functional block. In this embodiment, the operator can drill down from the original AAI to the BAIs of functional blocks of the technical system. This allows the operator to perform a root cause analysis at the level of functional blocks of the technical system and to quickly identify the functional block(s) which contribute most to an abnormal situation of the technical system as a whole as identified by the AAI.

In a further optional embodiment, a drilldown function to the level of system components is enabled. In this embodiment, the UI 130 further provides 1600 a subset TOPm of the univariate distances at the respective sampling time points to the operator. Thereby, the subset TOPm relates to such distances with the highest contributions to the augmentation of the aggregate abnormality indicator with the size m of the subset TOPm being predefined. As each univariate distance is directly associated with a signal which again is associated with a system component, a drill down to the component level is enabled. For example, the operator may set the size m so that he receives an amount of technical status information which can still be handled with his cognitive capabilities. Different operators may select different sizes. The computer system may set a default value which can be chosen as the average size used by all users of the computer system. Based on the technical status information conveyed to the operator 10 through the AAI (and the optional drill down information about BAIs and/or system components) the operator can initiate a corrective action 20 in response to the determined abnormality indicator(s). As a consequence, the computer system assist the operator in performing the technical task of monitoring the technical system and interact with the technical system when required.

In a further optional embodiment, as elaborated earlier, a particular technical status parameter, such as the status of a chemical reactor, may be represented by multiple sensor signals such, as for example temperatures measured by a plurality of temperature sensors. The sensors provide redundant information in specifying the particular technical status of the reactor. Nonetheless, each of the temperature signals indicates normal or abnormal operation of the reactor. The data processor may aggregate the univariate distances associated with the multiple sensor signals to provide a robust univariate distance for the particular technical status parameter. In the reactor example, the univariate distances corresponding to the temperature signals of the respective temperature sensors can be aggregated. If one of the sensors fails, there is still a meaningful distance value available which characterizes the technical status of the reactor. For example, a "two over three" vote can be used to get the actual reactor temperature in the case of one sensor failure. In other cases, the sensor redundancy may be used, for example, with a first sensor used by the control system and a second sensor used by a safety system.

Figure 3A:
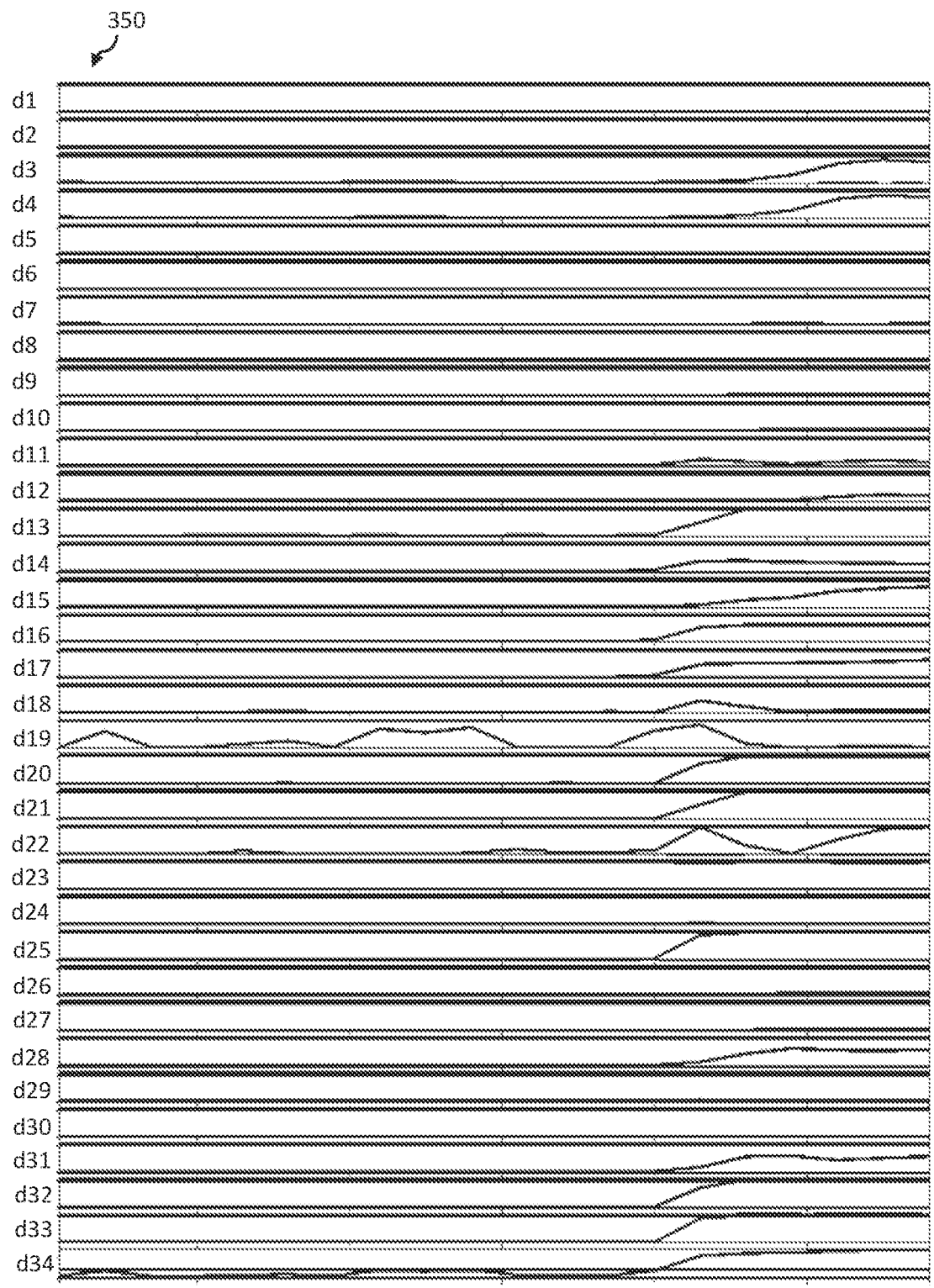
FIG. 3A illustrates univariate distances for example signals reflecting the technical status system components of the technical system.

FIG. 3A illustrates univariate distances d1 to d34 for real world example signals reflecting the technical status system components of a technical system. Some of the signals show an abnormal behavior at certain points in time which is reflected by a raise of the respective univariate distances (e.g., d3, d4, d13, d15, d20, d21, etc.) to the upper (abnormality) limit of the univariate distance range. Some signals (e.g., d5 to d10) show no raise of the univariate distance at all. Some signals (e.g., d18, d19) show an intermediate raise of the univariate distances which normalizes again without reaching the upper limit.

Figure 3B:
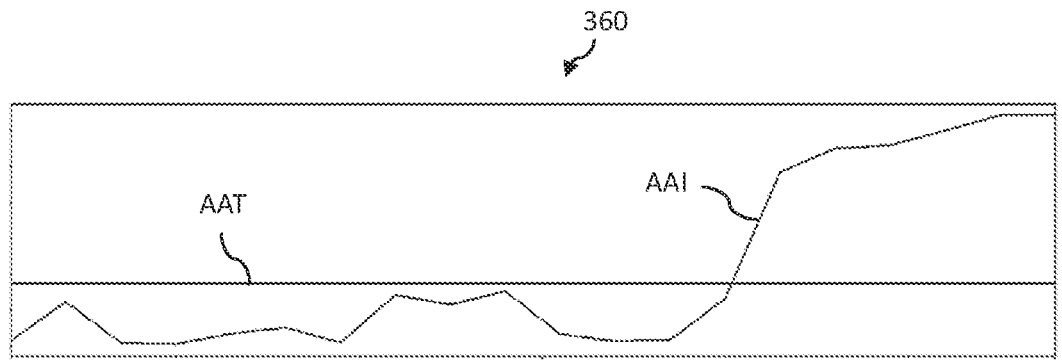
FIG. 3B shows an aggregate abnormality indicator for the technical system as computed according to an embodiment.

FIG. 3B shows a view 360 with the aggregate abnormality indicator AAI for the technical system which is provided to the operator of the technical system. The view 360 further includes a visualization of the abnormality threshold AAI against which the AAI is compared. The AAI is computed on the base of the univariate distances of FIG. 3A in accordance with formulas F5 of F6. The abnormality threshold AAT is predetermined so that an aggregate abnormality indicator value, when being below the abnormality threshold AAT, reflects normal operation of the technical system with a given probability p (e.g., p=0.95).

Advantageously, the abnormality threshold AAT is determined by using a cumulative distribution function of the aggregate abnormality indicator AAI during normal operation of the technical system. In probability theory and statistics, the cumulative distribution function (CDF) of a real-valued random variable Xl, evaluated at x, is the probability that Xl will take a value less than or equal to x. In the case of a continuous distribution, it gives the area under the probability density function from minus infinity to x.

Figure 3C:
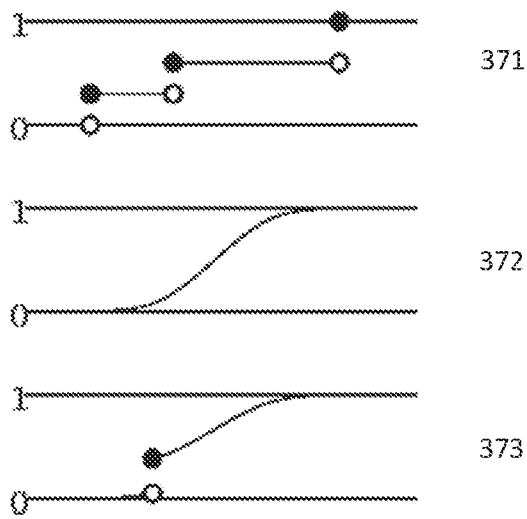
FIG. 3C illustrates types of cumulative distribution functions which can be used for determining abnormality thresholds according to an embodiment.

FIG. 3C illustrates CDF types of cumulative distribution functions which can be used for determining abnormality thresholds. Cumulative distribution functions are explained in detail in many publications, such as for example in "Introduction to Statistical Modelling" by Annette J. Dobson, Chapman and Hall, 1983. CDF type 371 shows the cumulative distribution function of a discrete probability distribution. CDF type 372 shows the cumulative distribution function of a continuous probability distribution. CDF type 373 shows the cumulative distribution function of a distribution which has both a continuous part and a discrete part. A person skilled in the art is able to select the appropriate CDF type for determining the abnormality threshold. In many cases CDF type 372 is appropriate.

Figure 3D:
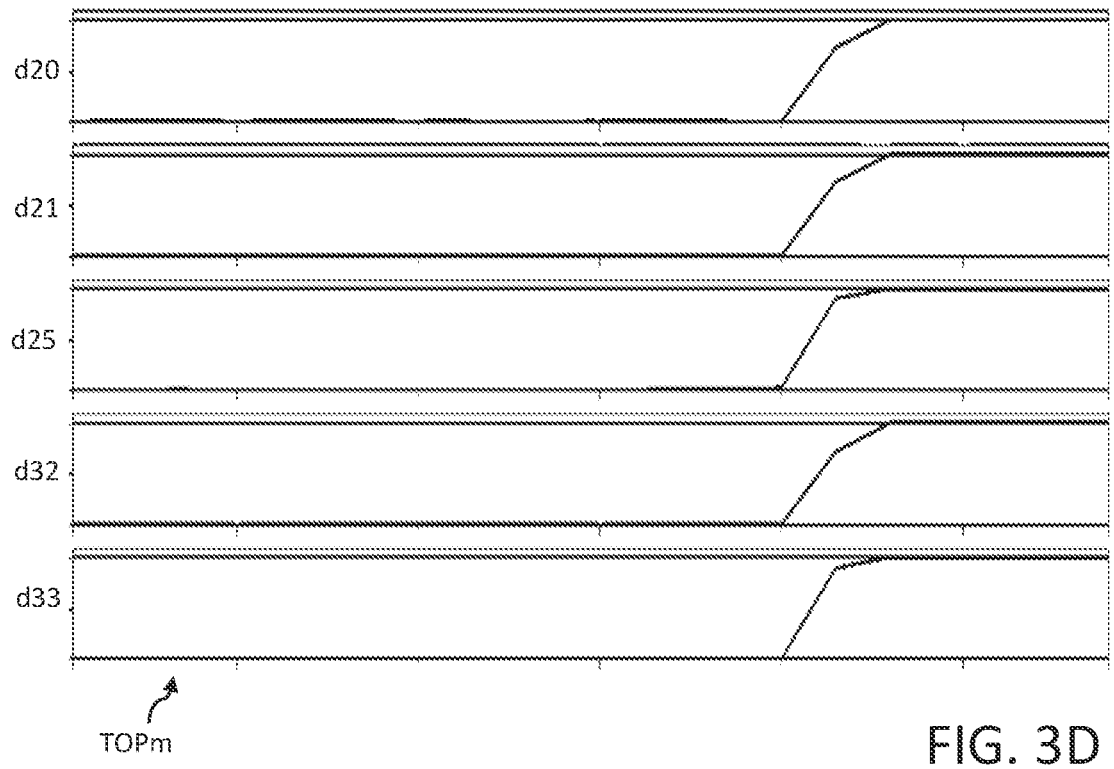
FIG. 3D shows univariate distances for a subset of signals with high contributions to the aggregate abnormality indicator according to an embodiment.

FIG. 3D shows univariate distances d20, d21, d25, d32, d33 for a subset of signals with high contributions to the aggregate abnormality indicator. In the example, the subset TOPm includes the top 5 distances amongst the univariate distances of FIG. 3A. The subset TOPm includes the predefined number m of univariate distances (in the example: m=5) making the highest contributions to the augmentation of the aggregate abnormality indicator AAI in FIG. 3B. The subset allows the operator to immediately drill down to the most relevant signals contributing to the abnormal system behavior indicated by the AAI when exceeding the abnormality threshold AAT in FIG. 3B. Therefore, the operator can focus on the potential root causes of the abnormal system behavior right away by focusing on status parameters which a potential high relevance for the abnormal behavior.

Figure 4:
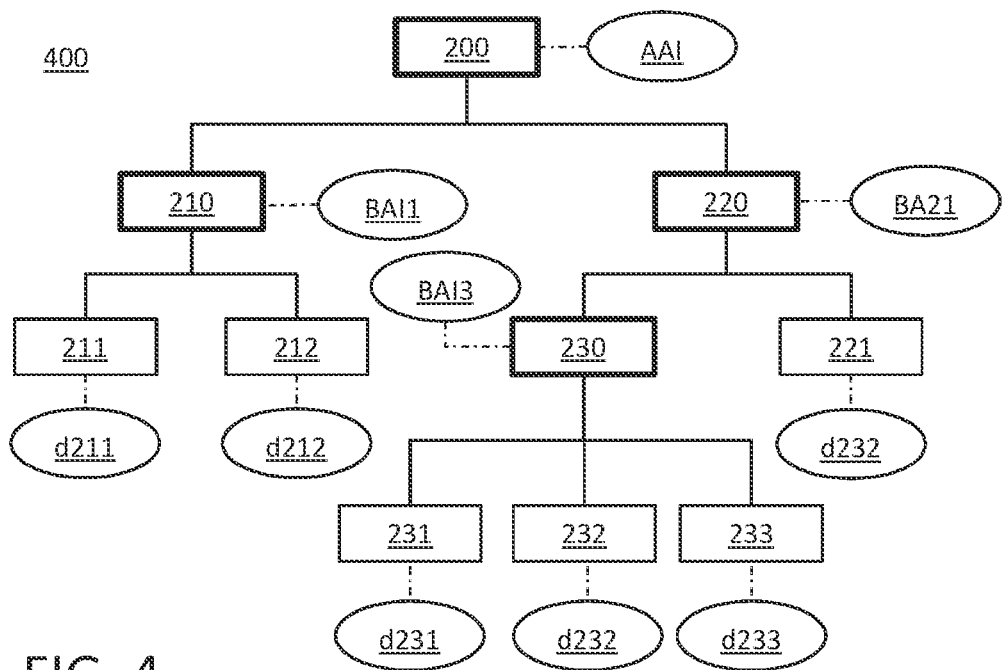
FIG. 4 illustrates an example of a component hierarchy of the technical system including functional blocks.

FIG. 4 illustrates an example of a component hierarchy 400 of the technical system 200 including functional blocks 210, 220, 230. As described in detail above, the technical status of the technical system 200 is reflected by the associated AAI. The technical system 200 typically includes a substantial number of system components which are monitored by respective sensor signals. Hierarchy 400 only shows a simplified view on technical system 200 with the system components 211, 212, 221, 231, 232, 233 which are supposed to be representative of hundreds or even thousands of components of a real-world technical process system. Each system component is associated with a respective univariate distance d211, d212, d221, d231, d232, d233 reflecting the technical status of the component.

Typically, certain functions of the technical system 200 are performed by sub-sets of components acting together to perform a respective function. In the example hierarchy 400, components 212, 213 are grouped into the functional block 210 for which the aggregate block abnormality indicator BAI1 is computed based on the subset of univariate distances d211, d212. For example, the functional block 210 may be an additive supply for a reactor which includes a tank 211 monitored via a level meter for which the univariate distance d211 is determined, and further includes a pump 212 monitored via a flow meter for which the univariate distance d212 is determined. The overall technical status of block 210 is then reflected by BAI1. Functional blocks may also include functional sub-blocks as shown in the example of functional block 220 which includes functional block 230 one level down in the hierarchy 400. For example, the functional block 220 may reflect a reactor function of the technical system 200 which includes the functional block 230 representing the reactor itself and a component 221 representing a peripheral component (e.g., an output valve) of the reactor function. For example, a chemical reactor may include components such as valves, tanks, heaters, pumps, coolers, sensors, security devices such as emergency cut-off switches, and others. The technical status of the valve 221 may be monitored by a respective flow meter for which the univariate distance d232 is determined. The technical status of the reactor 230 may be characterized by the filling level, temperature, and pressure in the reactor. A corresponding level meter 231, temperature meter 232 and pressure meter 233 are system components which are grouped into the reactor functional block 230. The associated univariate distances d231, d232 and d233 are aggregated into the respective aggregate block abnormality indicator BAI3 reflecting the overall technical status of the reactor. BAI3 is then aggregated with d232 into aggregate block abnormality indicator BAI2 which reflects the technical status of the overall reactor function 220 including peripheral components.

The use of aggregate block abnormality indicators associated with functional blocks of a component hierarchy 400 of the technical system 200 allows the operator to quickly drill down to a more granular view of the technical system and identify potential functions causing an abnormal behavior of the technical system. Similar as to the TOPm view of univariate distances in FIG. 3D, the user interface for the operator may also present such a top ranking list of aggregate functional block indicators allowing the operator to quickly identify functions to be analyzed in detail because of the abnormal behavior contributions reflected by the associated BAIs.

Figure 5A:
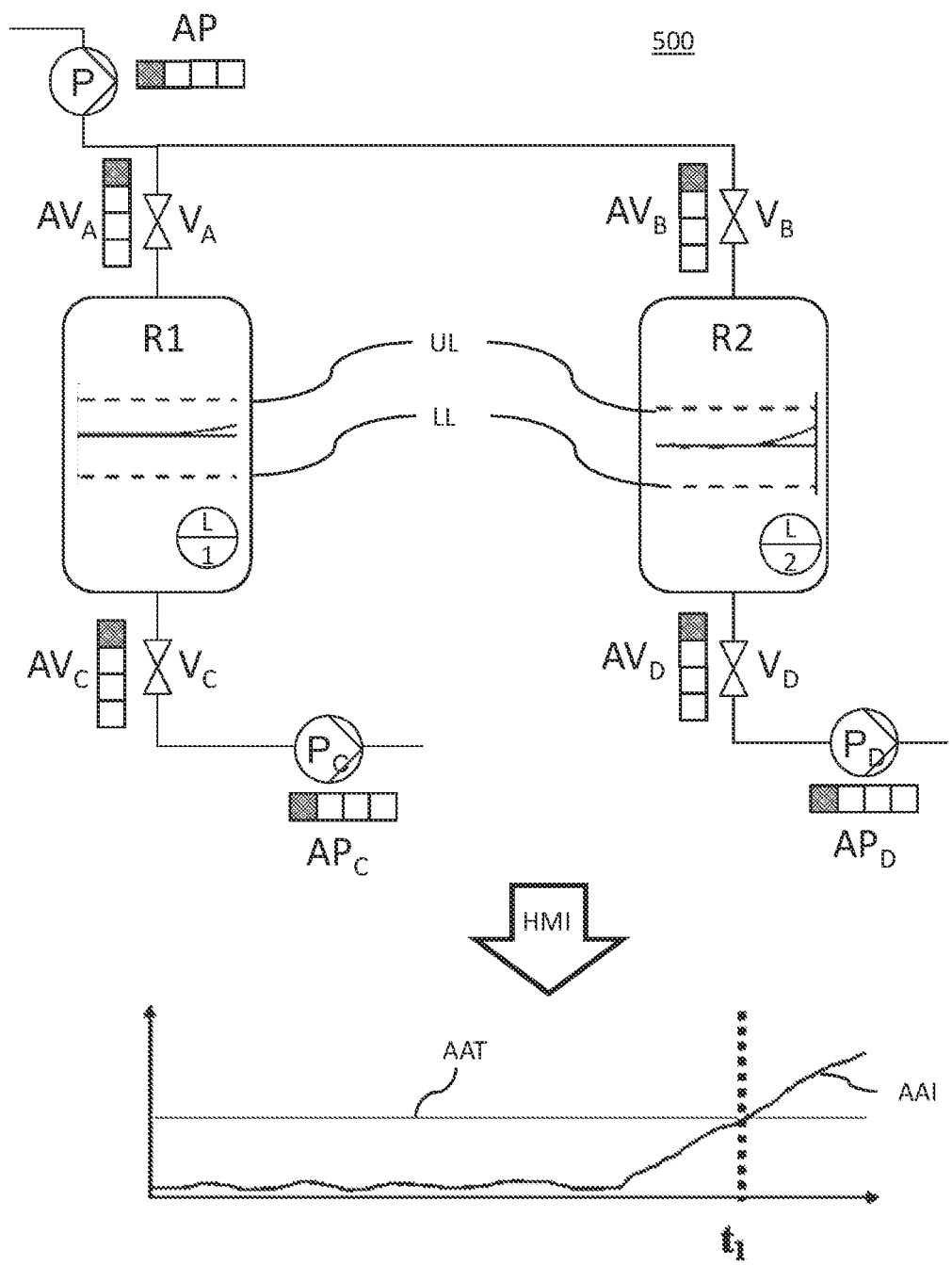

FIGS. 5A to 5C illustrate a real-world example scenario (including two reactor tanks) for which an aggregate abnormality indicator is determined. Process alarms are a known methodology to indicate a required action to the operator. For example, when a tank level reaches a certain limit, a high alarm is raised that indicates that the tank reached a high level. The affected equipment (system component(s)) typically is sending an alarm and a message text which is shown to the operator in an alarm list. The operator can then act accordingly and, for example, open a valve and start a pump to decrease the level inside the tank. When an alarm appears, it is usually visualized in an alarm list which includes technical names of the respective component signals like shown in table 1.

TABLE 1

TRADITIONAL ALARM LIST EXAMPLE

| day/time | signal | device type |
| --- | --- | --- |
| 05 15:25:28 | 70_V11 | Exhaust valve |
| 05 15:25:28 | 70_M1 | Fan |
| 05 15:25:28 | 70_M1 | Fan |
| 05 15:25:28 | 70_M2 | Fan |
| 05 15:25:28 | 70_P1 | Pump |
| 05 15:25:28 | 70_P1 | Pump |
| 05 15:25:28 | 70_V12 | Valve |
| 05 15:25:28 | 70_V13 | Valve |

Additionally, in some cases the alarm is also visualized in the human machine interface directly at the device. The operator can now react on those alarms. However, it is very difficult to perform any root cause analysis on this type of alarm information because often an alarm is followed by several consequential alarms. In the example in table 1, a plurality of system components to control the two reactors raised alarms. The operator is overwhelmed by the large number of process alarms (alarm floods) and is not able to decide on which alarm to react. The operator needs therefore a compact visualization of technical status information indicating the current process state and allowing to track the process state over time.

FIG. 5A shows a (simplified) part of a technical process system 500 which has two connected reactor tanks R1, R2. A pump P can supply liquid to the tanks. The inflow of the tanks is controlled by valves $V_A$ and $V_B$. There can be associated alarm visualizations AP, $AV_A$ and $AV_B$ implemented directly on the respective devices. Each reactor tank has a level meter L1, L2 to control the fill level of the respective tank R1, R2. The outflow of the tanks is controlled by valves $V_C$ and $V_D$ in combination with the pumps $P_C$ and $P_D$. Again, associated alarm visualization $AV_C$, $AV_D$, $AP_C$, and $AP_D$ may be available at the respective system components. For the tanks R1, R2 the level meter values may be visualized over time as a chart over time with a low level indicator LL (e.g., 5% of the tank level) and an upper level indicator UL (e.g., 95% of tank level) as boundaries of the normal operating range. For example, the LL boundary may correspond to the low alarm threshold in the alarm management system of system 500 and UL may correspond to the high alarm threshold. On an actual (real-world) operator screen, typically only the current value of the monitored technical parameter is displayed. To get the time trend of a process variable, the operator usually opens another page of the monitoring application. Therefore, the visualization of the time trend of the level meters L1, L2 in FIGS. 5A to 5C illustrates the concept of the visualization. In a real system, the data showing the time trend is typically retrieved in a multi-step interaction between the operator and the HMI.

As the figure is simplified, in reality, the reactors R1, R2 may be connected to further pipes with further inflow valves (e.g., for adding additives to the liquid stored in the tanks).

Further system components like temperature or pressure sensors for characterizing the technical status of the tanks are not shown in this figure. However, a person skilled in the art will understand that a real-world process system includes many more system components. However, for explaining the inventive concept, the simplified example of FIG. 5A is sufficient.

For both reactors, the actual fill levels raise over time and move above the average level indicated by the horizontal average line between UL and LL approaching the upper limit UL. The computer system can now determine the univariate distances for the level meter signals L1, L2 and compute the AAI for the overall process system 500. The result can be visualized via a human machine interface HMI to the operator. The operator immediately sees that at time $t_1$ the AAI exceeds the AAT threshold indicating an abnormal system behavior.

FIG. 5B illustrates that, for both reactors R1 and R2, the traditional alarm threshold for the respective level meter signals is exceeded at time points t1', t1" later than t1. In other words, the traditional alarm management raising alarms when signals exceed the high/low alarm thresholds indicates the abnormal situation in the system earliest at time point t1' which occurs after time point t1. That is, the aggregate alarm indicator AAI raises the alert to the operator at an earlier point in time than individual alarms at the signal level. In this case, the operator is informed "early enough" (i.e. before an alarm flood is generated by the control system) that the process is evolving towards an abnormal situation. The operator can take anticipated action on the process to avoid the process to reach an abnormal situation. This can be advantageous in case an immediate shut down of some equipment is required to avoid damage to certain system components. It is to be noted that FIGS. 5B, 5C do not show univariate distances for the level meter parameters but show the signal values SR1, SR2 in comparison to the high alarm thresholds HTR1, HTR2. The respective univariate distances are then computed based on these values. The process variables SR1, SR2 can exceed their alarm threshold HTR1, HTR2 (i.e., reach a level above upper limit). The corresponding univariate distances d(t) are bounded by 1). The aggregate abnormality indicator is bounded by $D(t)=\sqrt{\sum_{i=1}^{N}d(t)^2}=\sqrt{\sum_{i=1}^{N}1^2} \sqrt{N}$ with N being the number of process variables. This value can be normalized, i.e. divided by $\sqrt{N}$ to have a bound of 1 for D(t).

FIG. 5C illustrates a situation where a drill down of the AAI in FIG. 3A facilitates root cause analysis for the operator. In this example, only the level meter L1 of reactor R1 shows an abnormal behavior whereas L2 of R2 stays completely within the normal range. The operator can focus and react on the subset of process variables that are the most related to the deviation of the process abnormality indicator above its admissible limit.

Figure 6:
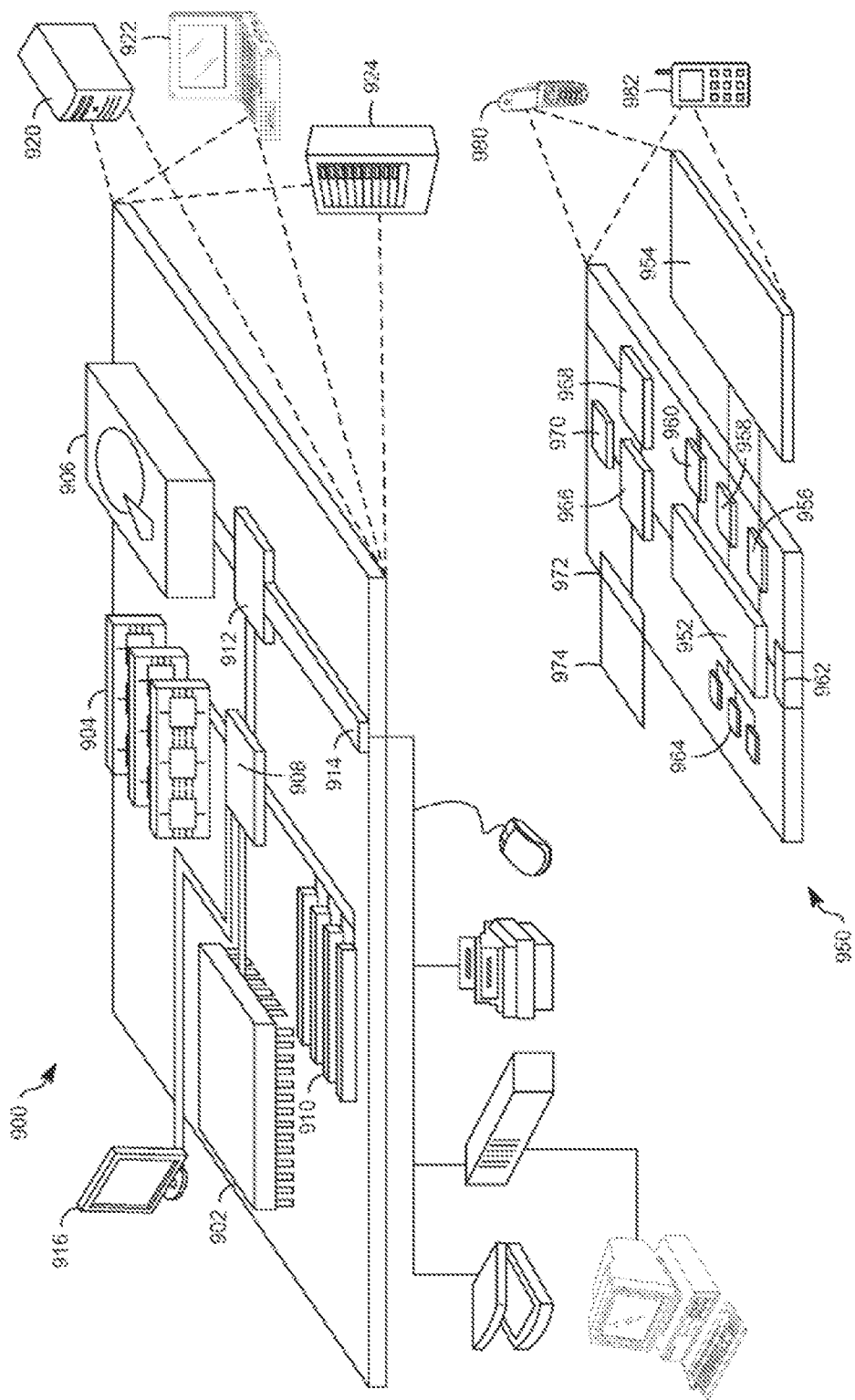
FIG. 6 is a diagram that shows an example of a generic computer device and a generic mobile computer device, which may be used with the techniques described herein.

FIG. 6 is a diagram that shows an example of a generic computer device 900 and a generic mobile computer device 950, which may be used with the techniques described here. In some embodiments, computing device 900 may relate to the system 100 (cf. FIG. 1).

Computing device 950 is intended to represent various forms of mobile devices, such as personal digital assistants, cellular telephones, smart phones, and other similar computing devices. In the context of this disclosure the computing device 950 may allow a human user to interact with the device 900. In other embodiments, the entire system 100 may be implemented on the mobile device 950. The components shown here, their connections and relationships, and their functions, are meant to be exemplary only, and are not meant to limit implementations of the inventions described herein.

Computing device 900 includes a processor 902, memory 904, a storage device 906, a high-speed interface 908 connecting to memory 904 and high-speed expansion ports 910, and a low speed interface 912 connecting to low speed bus 914 and storage device 906.

Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards. In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device, such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950,

952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver. In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for determining an abnormal technical status of a technical system, comprising:
   receiving, from the technical system, a plurality of signals, each signal being sampled over time and reflecting the technical status of at least one system component;
   computing, for each signal with associated high and low alarm thresholds obtained from an alarm management system, at every sampling time point, a univariate distance to its associated alarm thresholds as a maximum of the distances between a value of the respective signal and its associated alarm thresholds to quantify a degree of abnormality for the respective at least one system component;
   computing, at every sampling time point, based on the univariate distances at the respective sampling time points, an aggregate abnormality indicator reflecting the technical status of the technical system, and
   providing, to an operator, a comparison of the aggregate abnormality indicator with a predetermined abnormality threshold, the abnormality threshold ensuring with a given probability that an aggregate abnormality indicator value, when below the abnormality threshold, reflects normal operation of the technical system, the abnormal technical status being determined when the aggregate abnormality indicator exceeds the abnormality threshold,
   wherein, prior to the computing steps, a steady-state detection algorithm is used to determine whether the technical system is operating in a steady-state process, and when the technical system is not operating in the steady-state process, the computing steps are suppressed.

2. The method of claim 1, wherein the abnormality threshold is determined using a cumulative distribution function of the aggregate abnormality indicator during normal operation of the technical system.

3. The method of claim 1, wherein the aggregate abnormality indicator at a particular sampling time point is computed as:
   a Euclidian distance based on the univariate distances of the respective signals and a total number of signals, or
   a weighted Euclidian distance based on the univariate distances of the respective signals and the total number of signals, each univariate distance contribution being weighted with a weighting factor corresponding to a severity of an alarm associated with the respective signal as defined in the alarm management system.

4. The method of claim 1, further comprising:
   providing to the operator a subset of the univariate distances at the respective sampling time points, the subset relating to such univariate distances with highest contributions to an augmentation of the aggregate abnormality indicator, with a size of the subset being predefined.

5. The method of claim 1, wherein the univariate distance for a particular signal at a particular sampling time point is computed so that:
   the distance value is between 0 and 1 if the sampled signal value is between the low alarm threshold and the high alarm threshold,
   the distance value is 1 if the sampled signal value is less than or equal to the low alarm threshold, or greater than or equal to the high alarm threshold, and
   the distance value is 0 if the sampled signal value corresponds to a predefined parameter value reflecting normal operation.

6. The method of claim 1, wherein the univariate distance for a particular signal at a particular sampling time point is smoothened by exponential smoothing.

7. The method of claim 6, wherein the univariate distance for a particular signal at a particular sampling time point is computed by introducing an interval defining a normal range $[a_1, a_2]$ of the signal, with an upper interval limit $a_2$ being less than a respective high alarm threshold $x_h$ and a lower interval limit $a_1$ being greater than a respective low alarm threshold $x_l$, so that:
   the distance value is 0 if the sampled signal value is inside the interval, and
   the distance value is $$\left(\frac{x(t) - a_1}{x_l - a_1}\right)^a$$

for $x(t) < a_1$, and the distance value is $$\left(\frac{x(t) - a_2}{x_h - a_2}\right)^a$$

for $x(t) > a_2$, where $a > 1$.

8. The method of claim 1, wherein a component hierarchy of the technical system defines a plurality of functional blocks as child nodes of the technical system with each functional block comprising a plurality of child nodes including further functional blocks and/or system components, and
   wherein the method further comprises:
      computing, at every sampling time point, based on a subset of univariate distances associated with a particular functional block, at the respective sampling time points, an aggregate block abnormality indicator for the particular functional block, the block abnormality indicator reflecting the technical status of the functional block; and
      providing, to the operator, a comparison of the block abnormality indicator with a predetermined block abnormality threshold, the block abnormality threshold ensuring with a given probability that an aggregate block abnormality indicator value, when being below the block abnormality threshold, reflects normal operation of the particular functional block.

9. The method of claim 1, wherein a particular technical status parameter is represented by multiple sensor signals providing redundant information in specifying the particular technical status, and
   wherein the method further comprises:
      aggregating the univariate distances associated with the multiple sensor signals to provide a robust univariate distance for the particular technical status parameter.

10. A non-transitory computer-readable medium having processor-executable instructions stored thereon, wherein the processor-executable instructions, when executed by one or more processors, facilitate the method of claim 1.

11. A computer system for determining an abnormal technical status of a technical system, the computer system comprising:
   an interface configured to:
      receive, from the technical system, a plurality of signals, each signal being sampled over time and reflecting the technical status of at least one system component, and
      retrieve, from an alarm management system associated with the technical system, high alarm thresholds and low alarm thresholds associated with respective received signals, signal values of a particular signal in a range between the associated high alarm threshold and the associated low alarm threshold reflecting normal operation of the respective at least one system component,
   a data processor comprising a computation switch with a steady-state detection algorithm configured to determine whether the technical system is operating in a steady-state process and, when the technical system is not operate in the steady-state process, to suppress subsequent computation steps, the data processor configured to:
      compute, for each signal with associated alarm thresholds, at every sampling time point, a univariate distance to its associated alarm thresholds as a maximum of distances between the value of the respective signal and its associated alarm thresholds to quantify a degree of abnormality for the respective at least one system component, and
      compute, at every sampling time point, based on the univariate distances at the respective sampling time points, an aggregate abnormality indicator reflecting the technical status of the entire technical system, and
   a user interface component configured to provide, to an operator, a comparison of the aggregate abnormality indicator with a predetermined abnormality threshold the abnormality threshold ensuring with a given probability that an aggregate abnormality indicator value, when below the abnormality threshold, reflects normal operation of the technical system, the abnormal technical status being determined when the aggregate abnormality indicator exceeds the abnormality threshold.

12. The computer system of claim 11, wherein a component hierarchy of the technical system defines a plurality of functional blocks as child nodes of the technical system with each functional block comprising a plurality of child nodes comprising further functional blocks and/or system components,
   wherein the processor is configured to compute, at every sampling time point, based on a subset of univariate distances associated with a particular functional block, at the respective sampling time points, an aggregate block abnormality indicator for the particular functional block, the block abnormality indicator reflecting the technical status of the functional block, and
   wherein the user interface is configured to provide, to the operator, a comparison of the block abnormality indicator with a predetermined block abnormality threshold, the block abnormality threshold ensuring with a given probability that an aggregate block abnormality indicator value, when below the block abnormality threshold, reflects normal operation of the particular functional block.

13. The computer system of claim 11, wherein the user interface is configured to provide to the operator a subset of the univariate distances at the respective sampling time points, the subset relating to such distances with highest contributions to an augmentation of the aggregate abnormality indicator with a size of the subset being predefined.

14. A computer-implemented method for determining an abnormal technical status of a technical system, comprising:
   receiving, from the technical system, a plurality of signals, each signal being sampled over time and reflecting the technical status of at least one system component;
   computing, for each signal with associated high and low alarm thresholds obtained from an alarm management system, at every sampling time point, a univariate distance to its associated alarm thresholds as a maximum of the distances between a value of the respective signal and its associated alarm thresholds to quantify a degree of abnormality for the respective at least one system component;
   computing, at every sampling time point, based on the univariate distances at the respective sampling time points, an aggregate abnormality indicator reflecting the technical status of the technical system, wherein the aggregate abnormality indicator at a particular sampling time point is computed as:
      a Euclidian distance based on the univariate distances of the respective signals and a total number of signals, or
      a weighted Euclidian distance based on the univariate distances of the respective signals and the total number of signals, each univariate distance contribution being weighted with a weighting factor corresponding to a severity of an alarm associated with the respective signal as defined in the alarm management system; and providing, to the operator, a comparison of the aggregate abnormality indicator with a predetermined abnormality threshold, the abnormality threshold ensuring with a given probability that an aggregate abnormality indicator value, when below the abnormality threshold, reflects normal operation of the technical system, the abnormal technical status being determined when the aggregate abnormality indicator exceeds the abnormality threshold.

15. The method of claim 14, wherein the abnormality threshold is determined using a cumulative distribution function of the aggregate abnormality indicator during normal operation of the technical system.

16. The method of claim 14, further comprising:

providing to the operator a subset of the univariate distances at the respective sampling time points, the subset relating to such univariate distances with highest contributions to an augmentation of the aggregate abnormality indicator, with a size of the subset being predefined.

17. The method of claim 14, wherein the univariate distance for a particular signal at the particular sampling time point is computed so that:

the distance value is between 0 and t if the sampled signal value is between the low alarm threshold and the high alarm threshold, the distance value is 1 if the sampled signal value is less than or equal to the low alarm threshold, or greater than or equal to the high alarm threshold, and the distance value is 0 if the sampled signal value corresponds to a predefined parameter value reflecting normal operation.

18. The method of claim 14, wherein the univariate distance for a particular signal at the particular sampling time point is smoothened by exponential smoothing.

19. The method of claim 14, wherein a component hierarchy of the technical system defines a plurality of functional blocks as child nodes of the technical system with each functional block comprising a plurality of child nodes including further functional blocks and/or system components, and wherein the method further comprises:

computing, at every sampling time point, based on a subset of univariate distances associated with a particular functional block, at the respective sampling time points, an aggregate block abnormality indicator for the particular functional block, the block abnormality indicator reflecting the technical status of the functional block; and providing, to the operator, a comparison of the block abnormality indicator with a predetermined block abnormality threshold, the block abnormality threshold ensuring with a given probability that an aggregate block abnormality indicator value, when being below the block abnormality threshold, reflects normal operation of the particular functional block.

20. The method of claim 14, wherein a particular technical status parameter is represented by multiple sensor signals providing redundant information in specifying the particular technical status, and wherein the method further comprises:

aggregating the univariate distances associated with the multiple sensor signals to provide a robust univariate distance for the particular technical status parameter.

* * * * *